T. DE M. HAWKES.
CONDIMENT HOLDER.
APPLICATION FILED JUNE 27, 1916.
1,243,836.
Patented Oct. 23, 1917.
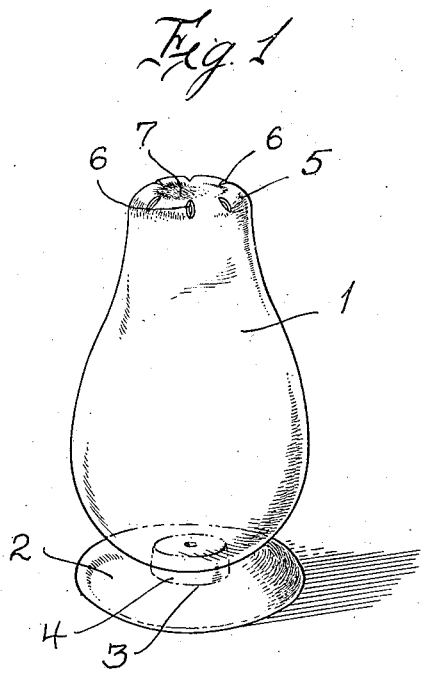
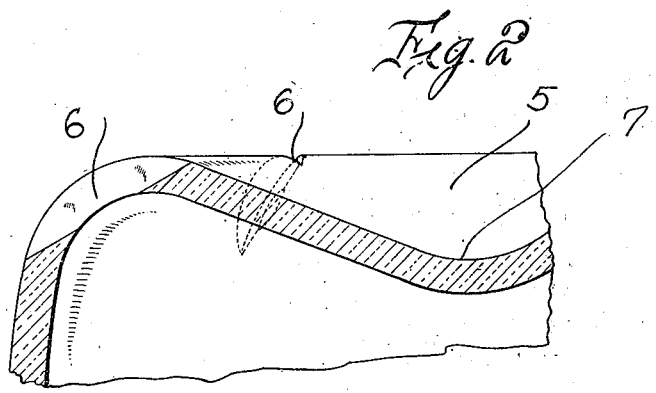
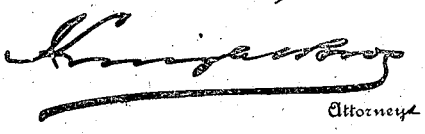

UNITED STATES PATENT OFFICE.

TOWNSEND DE M. HAWKES, OF CORNING, NEW YORK, ASSIGNOR TO T. G. HAWKES & CO., OF CORNING, NEW YORK, A CORPORATION OF NEW YORK.

CONDIMENT-HOLDER.

1,243,836.

Specification of Letters Patent. Patented Oct. 23, 1917.

Application filed June 27, 1916. Serial No. 106,160.

*To all whom it may concern:*

Be it known that I, TOWNSEND DE M. HAWKES, a citizen of the United States, residing at Corning, in the county of Steuben and State of New York, have invented certain new and useful Improvements in Condiment-Holders, of which the following is a specification.

This invention relates particularly to glass or china condiment holders and is especially adapted for use in dispensing salt.

The primary object of the invention is to provide a device which will facilitate the dispensing of condiment from a holder, such for instance as salt, to which end, one feature of the invention consists in so constructing the device that the ingredients will be directed toward the discharge openings in the holder when the holder is shaken.

A further object of the invention is to so construct the holder that the condiment or ingredients will be disintegrated when the holder is shaken.

A still further object of the invention is to produce a device of this character which will be exceedingly simple to manufacture, in that the discharge openings or orifices, which are provided for dispensing the ingredients, may be produced by a device which is used to perform other functions in the glass making art, such for instance as producing the discharge openings or orifices by employing an ordinary glass cutting miter wheel.

As heretofore practised, salt shakers are sometimes constructed, especially those made of glass or china, by providing an opening in the bottom of the shaker, whereby the shaker may be filled, and by drilling discharge openings in the top of the shaker by means of a pointed drill. Such a method, especially the feature of drilling the discharge openings, has proven quite an expense, especially when compared with the method of producing the openings as proposed by the present invention. Therefore, another feature of the present invention consists in producing the discharge openings in the top of the shaker at a considerably less expense, as well as a saving of time.

Other features of the invention will be further described with reference to the accompanying drawing, in which—

Figure 1 is a perspective view of a salt shaker embodying the characteristics of the present invention, and Fig. 2 is an enlarged detail view of a portion of the top of a salt shaker constructed in accordance with the present invention.

Referring to the drawing in detail, 1 represents the shaker or holder which may be produced in any desired design or shape, preferably having a suitable supporting base 2, provided with an opening 3 for filling the shaker. This opening is adapted to be closed by a suitable stopper 4. The body of the holder, as shown, preferably comprises an enlarged space tapering toward the top 5 thereof, which top comprises the shaker end of the device and is constructed with a plurality of discharge openings 6, provided in the perimeter thereof, having a central depression or concaved portion 7 surrounded by the discharge openings. As stated, the discharge openings in the perimeter of the shaker end of the device are preferably made by an ordinary glass cutting miter wheel, by which they are constructed with outwardly flaring sides having tapering walls substantially oval in shape and tapering toward the inner side of the shaker. The depression 7 is produced for two purposes, one of which is to direct the condiment contained in the shaker toward the discharge openings, and the other purpose of which is to provide a shoulder on the periphery of the shaker end of the device in which the discharge openings are made. By thus producing a shoulder at the perimeter of the shaker end of the device, the discharge openings may be more readily produced than if the top was made without the depression. By producing the discharge openings with outwardly flaring walls, the disadvantage of chokage which is common to discharge openings of most condiment holders, is overcome, in that the outwardly flaring walls of the discharge openings offer a more free and unobstructed discharge of the condiment.

From a commercial standpoint, it is preferably desirable to construct the device of glass, but it is to be understood that the invention is not limited to constructing the device of this particular material, as the device could be readily manufactured from china, or in fact any other suitable material.

I claim:—

A condiment holder having a shaker end provided with a depression in the top thereof, and a plurality of discharge openings provided in the perimeter of the shaker end and surrounding said depression, said openings having outwardly flaring walls tapering from the outside of the receptacle to the inside of the shaker end.

The foregoing specification signed at Corning, New York, this 24th day of June, 1916.

TOWNSEND DE M. HAWKES.

Copies of this patent may be obtained for five cents each, by addressing the "Commissioner of Patents, Washington, D. C."